United States Patent
Dippenaar et al.

(10) Patent No.: US 11,729,073 B2
(45) Date of Patent: *Aug. 15, 2023

(54) DYNAMIC SCALING OF STORAGE VOLUMES FOR STORAGE CLIENT FILE SYSTEMS

(71) Applicant: Amazon Technologies, Inc., Seattle, WA (US)

(72) Inventors: Andries Petrus Johannes Dippenaar, Cape Town (ZA); Gavin Alexander Bramhill, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,083

(22) Filed: Oct. 29, 2021

(65) Prior Publication Data
US 2022/0141100 A1 May 5, 2022

Related U.S. Application Data

(63) Continuation of application No. 16/818,363, filed on Mar. 13, 2020, now Pat. No. 11,165,667, which is a
(Continued)

(51) Int. Cl.
*H04L 41/5051* (2022.01)
*G06F 16/182* (2019.01)
(Continued)

(52) U.S. Cl.
CPC ........ *H04L 41/5051* (2013.01); *G06F 3/0604* (2013.01); *G06F 3/0605* (2013.01);
(Continued)

(58) Field of Classification Search
CPC . H04L 67/1097; H04L 67/16; H04L 41/5051; H04L 43/04; G06F 3/067; G06F 3/0605; G06F 3/0631
(Continued)

(56) References Cited

U.S. PATENT DOCUMENTS 6,389,432 B1 * 5/2002 Pothapragada ......... G06F 3/067
6,609,187 B1 8/2003 Merrell et al.
(Continued)

FOREIGN PATENT DOCUMENTS

| CN | 103049574 A | 4/2013 |
|---|---|---|
| CN | 103561101 A | 2/2014 |
| EP | 2758888 A1 | 7/2014 |

OTHER PUBLICATIONS

Extended European Search Report and Written Opinion dated Nov. 2, 2022 in European Patent Application No. 22164322.4, Amazon Technologies, Inc.
(Continued)

*Primary Examiner* — Tauqir Hussain
(74) *Attorney, Agent, or Firm* — Robert C. Kowert; Kowert, Hood, Munyon, Rankin & Goetzel, P.C.

(57) ABSTRACT

A network-based data store maintaining storage volumes for file systems at storage clients may implement dynamic storage volume scaling. A scaling event may be detected according to a specified scaling policy for a storage volume maintained at a network-based data store that is mounted at a storage client and configured for a file system. In a least some embodiments, the scaling policy for the storage volume may be received from the storage client. In response to detecting the storage event, storage maintaining the storage volume may be modified according to the scaling policy to scale the storage volume. An indication of the scaling event may be sent to the storage client in order to update the file
(Continued)

system at the storage client so that the file system may utilize the scaled storage volume.

20 Claims, 8 Drawing Sheets

Related U.S. Application Data continuation of application No. 15/489,537, filed on Apr. 17, 2017, now Pat. No. 10,594,571, which is a continuation of application No. 14/534,097, filed on Nov. 5, 2014, now Pat. No. 9,628,350.

(51) Int. Cl.
*G06F 16/11* (2019.01)
*H04L 67/51* (2022.01)
*H04L 67/1097* (2022.01)
*G06F 3/06* (2006.01)
*H04L 41/5009* (2022.01)
*H04L 43/04* (2022.01)

(52) U.S. Cl.
CPC ............ *G06F 3/067* (2013.01); *G06F 3/0631* (2013.01); *G06F 16/11* (2019.01); *G06F 16/183* (2019.01); *H04L 41/5009* (2013.01); *H04L 43/04* (2013.01); *H04L 67/1097* (2013.01); *H04L 67/51* (2022.05)

(58) Field of Classification Search
USPC ........................................................ 709/224
See application file for complete search history.

(56) References Cited

U.S. PATENT DOCUMENTS

| | | | |
|---|---|---|---|
| 6,829,688 B2 | 12/2004 | Grubbs et al. | |
| 7,409,523 B2 | 8/2008 | Pudipeddi et al. | |
| 7,509,645 B2 | 3/2009 | Coates et al. | |
| 8,479,211 B1* | 7/2013 | Marshall | G06F 16/134 718/104 |
| 8,601,134 B1* | 12/2013 | Sorenson, III | H04L 67/2842 709/227 |
| 9,203,900 B2* | 12/2015 | Rao | H04L 29/08549 |
| 9,311,194 B1* | 4/2016 | Cypher | G06F 9/5083 |
| 9,628,350 B2 | 4/2017 | Dippenaar et al. | |
| 10,216,770 B1* | 2/2019 | Kulesza | G06F 16/182 |
| 10,594,571 B2 | 3/2020 | Dippenaar et al. | |
| 10,606,625 B1* | 3/2020 | Belianski | G06F 3/0607 |
| 11,138,028 B1* | 10/2021 | Belianski | G06F 3/067 |
| 11,165,667 B2 | 11/2021 | Dippenaar et al. | |
| 2004/0215749 A1* | 10/2004 | Tsao | H04L 41/12 709/220 |
| 2005/0027938 A1 | 2/2005 | Burkey | |
| 2005/0203910 A1* | 9/2005 | Taguchi | G06F 3/067 |
| 2006/0095705 A1* | 5/2006 | Wichelman | G06F 3/0665 711/171 |
| 2006/0101204 A1 | 5/2006 | Bao | |
| 2007/0043923 A1* | 2/2007 | Shue | G06F 9/5083 711/170 |
| 2007/0143563 A1 | 6/2007 | Pudipeddi et al. | |
| 2008/0208932 A1 | 8/2008 | Tsuge et al. | |
| 2009/0106255 A1 | 4/2009 | Lacapra et al. | |
| 2009/0327798 A1 | 12/2009 | D'Amato et al. | |
| 2010/0241673 A1 | 9/2010 | Wu et al. | |
| 2011/0191485 A1 | 8/2011 | Umbehocker | |
| 2012/0054197 A1 | 3/2012 | San Martin et al. | |
| 2012/0150930 A1 | 6/2012 | Jin et al. | |
| 2013/0227145 A1* | 8/2013 | Wright | H04L 67/1029 709/226 |
| 2014/0095826 A1* | 4/2014 | Rajagopal | H04L 67/1097 711/170 |
| 2014/0149590 A1 | 5/2014 | Mallipeddi et al. | |
| 2014/0164621 A1* | 6/2014 | Nakama | H04L 67/1097 709/226 |
| 2014/0181051 A1 | 6/2014 | Montulli et al. | |
| 2014/0250155 A1* | 9/2014 | Chen | G06F 16/1858 707/823 |
| 2014/0279838 A1 | 9/2014 | Tsirogiannis et al. | |
| 2014/0317681 A1* | 10/2014 | Shende | H04L 63/10 726/1 |
| 2014/0359127 A1* | 12/2014 | Linares | H04L 41/0843 709/226 |
| 2014/0372832 A1 | 12/2014 | Cho et al. | |
| 2016/0127200 A1* | 5/2016 | Dippenaar | G06F 3/0605 709/224 |
| 2017/0039218 A1* | 2/2017 | Prahlad | H04L 63/0428 |
| 2022/0004411 A1* | 1/2022 | Belianski | G06F 9/45545 |

OTHER PUBLICATIONS

International Search Report and Written Opinion from PCT/US/ 2015/059318, dated Feb. 11, 2016, Amazon Technologies, Inc., pp. 1-12.
Search Report and Written Opinion from Singapore Application No. 11201703728T, dated Jan. 31, 2018, Amazon Technologies, Inc., pp. 1-11.
Office Action dated Jan. 20, 2023 in Chinese Patent Application No. 202010482704.2, Amazon Technologies, Inc., pp. 1-12 (including translation).

* cited by examiner

DYNAMIC SCALING OF STORAGE VOLUMES FOR STORAGE CLIENT FILE SYSTEMS

This application is a continuation of U.S. patent application Ser. No. 16/818,363, filed Mar. 13, 2020, which is a continuation of U.S. patent application Ser. No. 15/489,537, filed Apr. 17, 2017, now U.S. Pat. No. 10,594,571, which is a continuation of U.S. patent application Ser. No. 14/534,097, filed Nov. 5, 2014, now U.S. Pat. No. 9,628,350, which are hereby incorporated in reference herein in their entirety.

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments are frequently supported by block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. However, as network transmission capabilities increase, along with greater processing capacity for virtualized resources, I/O demands upon block-based storage may grow. If I/O demands exceed the capacity of block-based storage to service requests, then latency and/or durability of block-based storage performance for virtualized computing resources suffer, resulting in a loss of virtualized computing performance.

Figure 1:
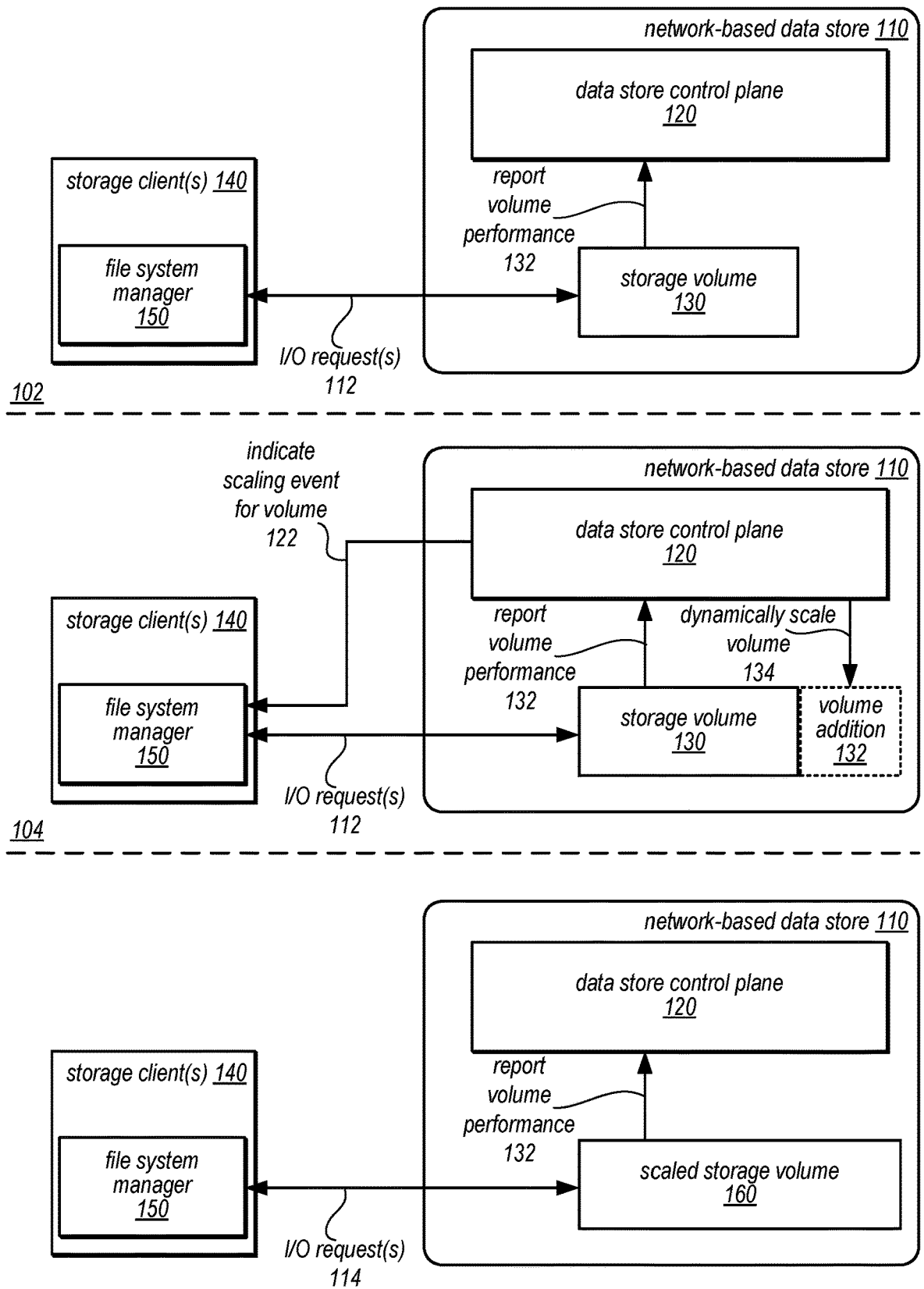
FIG. 1 is a series of diagrams illustrating dynamic scaling of storage volumes for storage client file systems, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of dynamic scaling of storage volumes for storage client file systems are described herein. Network-based data stores offer durable and flexible storage solutions for a variety of different storage client applications. For example, storage clients may implement a storage volume that supports a file system in a network-based data store. Providing dynamic scaling of storage volumes allows the storage costs to tightly fit the actual use of the storage volume, compensating for changing storage requirements over time. FIG. 1 is a series of diagrams illustrating dynamic scaling of storage volumes for storage client file systems, according to some embodiments. Network-based data store 110 may provide persistent data storage for various storage client(s) 140. Storage in network-based data store 110 may be block-based storage, in at least some embodiments. Storage client(s) 140 may provision a storage volume 130 in network-based data store 110. Upon provisioning the data store, the storage client(s) 140 may mount the storage volume and configure it for a file system implemented at storage client(s) 140.

As noted earlier, storage capacity and/or performance needs may change over time. In light of these changes, statically provisioned storage resources may become less cost efficient. Moreover, for network-based data stores providing storage for multiple different storage clients, under-used storage resources may be better utilized for another storage client, reducing efficiency for the network-based data store. Thus, in various embodiments, network-based data store 110 may implement dynamic scaling of storage volumes for storage client file systems. As illustrated in scene 102, file system manager 150 at storage client(s) 140 may send various I/O requests to storage volume 130 as part of utilizing storage volume for the file system implemented at storage client(s) 140. Volume performance may be reported 132 to data store control plane 120, which may monitor the storage volume to detect scaling events for the storage volume 130.

Scaling events may be detected according to a scaling policy for the storage volume 130. A scaling policy may include on or more conditions that trigger various control plane actions to scale the storage volume 130. For example, storage volume 130 may be scaled to increase in size, decrease in size, redistribute storage resources for the storage volume differently, and/or provision different throughput performance (e.g., input/output operations per second (IOPs)) for the storage volume 130. Various different thresholds or conditions may be evaluated with respect to volume performance metrics and storage capacity to detect scaling events (e.g., too much or too little storage capacity or bandwidth).

As illustrated in scene 104, a scaling event for the storage volume 130 has occurred. Data store control plane 120 provides an indication of the scaling event for the volume 122 to file system manager 150. This indication may allow file system manager 150 to access the scaled storage volume. Data store control plane 120 also dynamically scales the storage volume, adding addition 132 in this example. Various different storage operations to allocate storage resources commensurate with the desired configuration of the storage volume for the scaling event may be performed, including various storage maintenance operations. File system manager 150 may receive the indication 122, and update the file system at the storage client(s) 140 to include the scaled storage volume 160. For instance, file system manager 150 may perform various resize operations to update file system metadata to indicate the scaled storage volume 160 as a result of the volume addition 132. File system manager 150 may then send I/O requests 114 to utilize the scaled storage volume in network-based data store 110.

Please note, FIG. 1 is provided as an illustration dynamic scaling of storage volumes for storage client file systems, and is not intended to be limiting as to the physical arrangement, size, or number of components, modules, or devices, described therein.

The specification first describes an example of a network-based data store as a block-based storage service, which may provide dynamic scaling of storage volumes for storage client file systems. Various components, modules, systems, or devices which may implement the block-based storage service and a client of the block-based storage service are described. The specification then describes flowcharts of various embodiments of methods for implementing dynamic scaling of storage volumes for storage client file systems. Next, the specification describes an example system that may implement the disclosed techniques. Various examples are provided throughout the specification.

Figure 2:
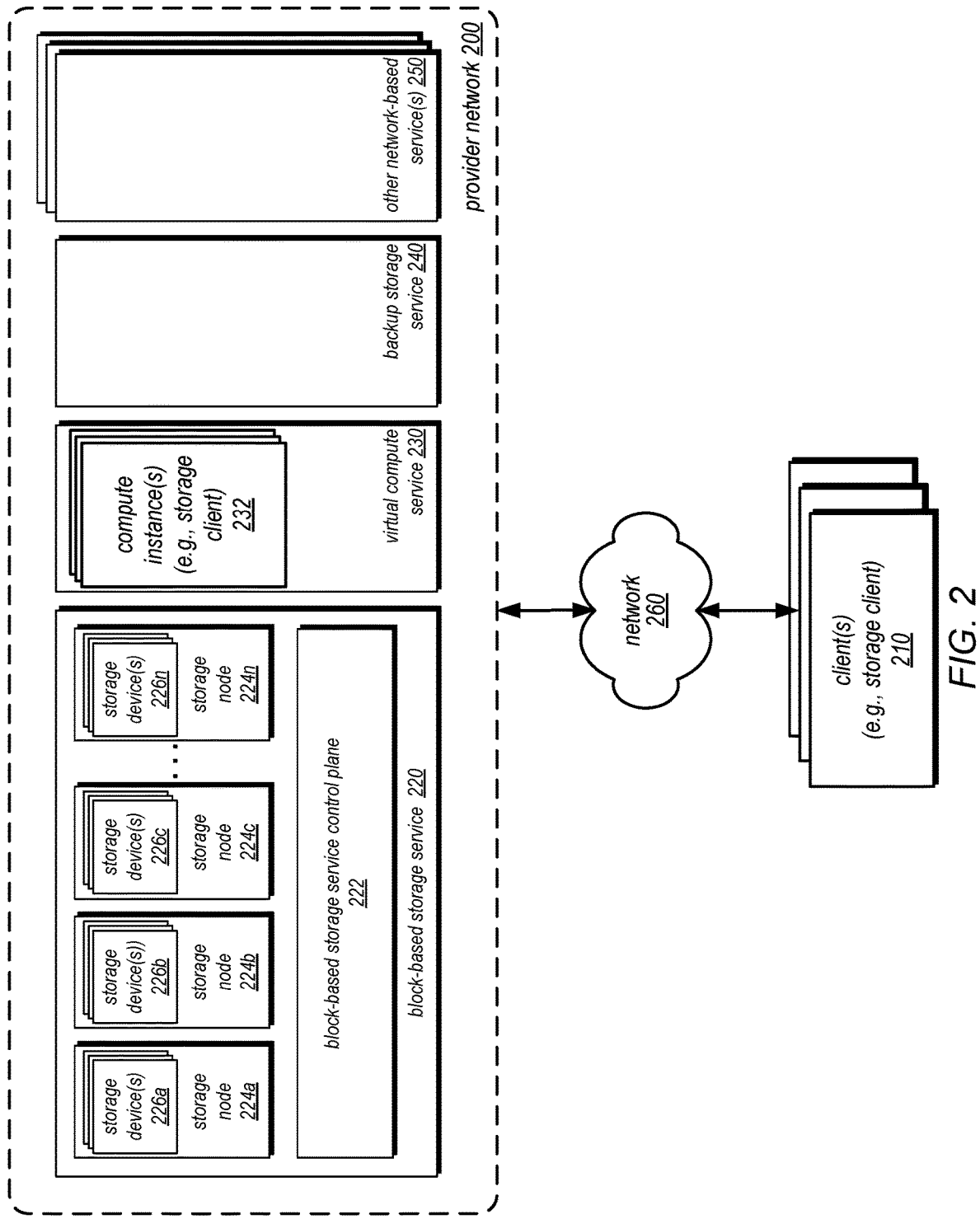
FIG. 2 is a block diagram illustrating a provider network that implements a block-based storage service implementing dynamic scaling of storage volumes for storage client file systems, according to some embodiments.

FIG. 2 is a block diagram illustrating a provider network that implements a block-based storage service implementing dynamic scaling of storage volumes for storage client file systems, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instance(s) 232 to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including general purpose or special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instance(s) 232 may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent storage nodes 224a, 224b, 224c through 224n(e.g., server block data storage systems), which provide block level storage utilizing one or more persistent storage device(s) 226a, 226b, 226c, through 226n. Storage volumes maintained may be mapped to particular clients, providing virtual block-based storage (e.g., hard disk storage or other persistent storage) as a contiguous set of logical blocks. In some embodiments, a storage volume may be divided up into multiple data chunks (including one or more data blocks) for performing other block storage operations, such as snapshot operations or replication operations.

A volume snapshot of a storage volume may be a fixed point-in-time representation of the state of the storage volume. In some embodiments, volume snapshots may be stored remotely from a storage node 224 maintaining a storage volume, such as in backup storage service 240. Snapshot operations may be performed to send, copy, and/or otherwise preserve the snapshot of a given storage volume in another storage location, such as a remote snapshot data store in backup storage service 240.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems (e.g., client(s) 210) external to provider network 200 available over a network 260. Access to storage volumes on storage nodes 224 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of storage volumes and scaling policies in response to configuration requests. Block-based storage service control plane 222 may also provide services related to the creation, usage and deletion of volume snapshots on backup storage service 240. Block-based storage service control plane 222 may also provide services related to the collection and processing of performance and auditing data related to the use of storage volumes and snapshots of those volumes.

Block-based storage service 220 may manage and maintain storage volumes in a variety of different ways. Different durability schemes may be implemented for some data volumes among two or more storage nodes maintaining a replica of a storage volume. For example, different types of mirroring and/or replication techniques may be implemented (e.g., RAID 1) to increase the durability of a data volume, such as by eliminating a single point of failure for a data volume. In order to provide access to a storage volume, storage nodes may then coordinate I/O requests, such as write requests, among the two or more storage nodes maintaining a replica of a storage volume.

Provider network 200 may also implement backup storage service 240, as noted above. Backup storage service 240 may provide a same or different type of storage as provided by block-based storage service 220. For example, in some embodiments other storage service 240 may provide an object-based storage service, which may store and manage data as data objects. For example, volume snapshots of various storage volumes may be stored as snapshot objects for a particular storage volume. In addition to backup storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a storage volume, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or storage volume in a manner that is transparent to applications implement on the client 210 utilizing computational resources provided by the compute instance or block storage provided by the storage volume. In at least some embodiments, client(s) 210 may provision, mount, and configure storage volumes implemented at block-based storage service 220 for file systems implemented at client(s) 210.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
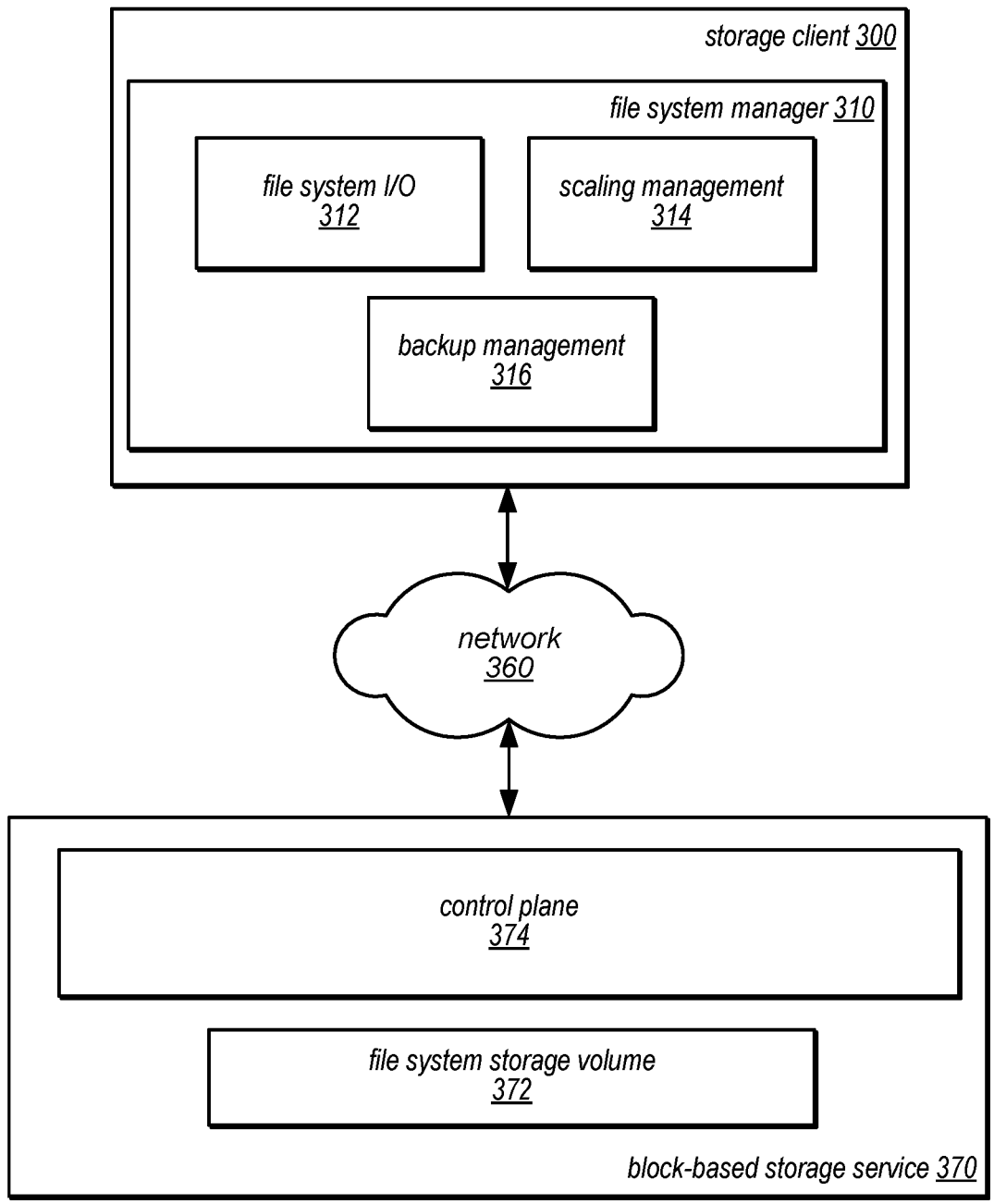
FIG. 3 is a block diagram illustrating various components of a storage client, according to some embodiments.

The various storage clients discussed above may be implemented in many ways. FIG. 3 is a block diagram illustrating various components of a storage client, according to some embodiments. Storage client 300, which may be clients 210, virtual compute instances 232, or internal client discussed above, may communicate over network 360 (similar to network 260 above) with block-based service 370. Block-based storage service 370 may be similar to block-based storage service 220 in some embodiments. Storage client 300 may mount a storage volume 372 maintained in block-based storage system 370 for a file system implemented at storage client 300.

In various embodiments, storage client 300 may implement file system manager 310 which may be configured to direct Input/Output (I/O) between various components of storage client 300. In various embodiments, file system manager 310 may be implemented as part of a kernel in an operating system for storage client 300. File system manager 310 may handle changes to a file system, among other I/O. File system manager 310 may implement scaling management module 314 to handle various indications of scaling events for storage volume 372 in block-based storage service 370 from control plane 374. For example, scaling management module 314 may perform the various techniques discussed below with regard to FIGS. 6 and 7 to update the file system maintained at storage client 300. Resize operations, for instance, to update various metadata and information structures for the file system (not illustrated). Scaling management module 314 may, in some embodiments, collect various file system performance metrics (e.g., storage capacity, access patterns, I/O performance) and send them to control plane 374. In at least some embodiments, control plane 374 may detect scaling events for storage volumes based, at least in part, on performance metrics collected at the storage client. In various embodiments, file system manager 310 may implement backup management module 316. Backup management module 368 may direct or send snapshots of the file system to backup storage, such as may be provided by backup storage service 240 in FIG. 2 above.

Figure 4:
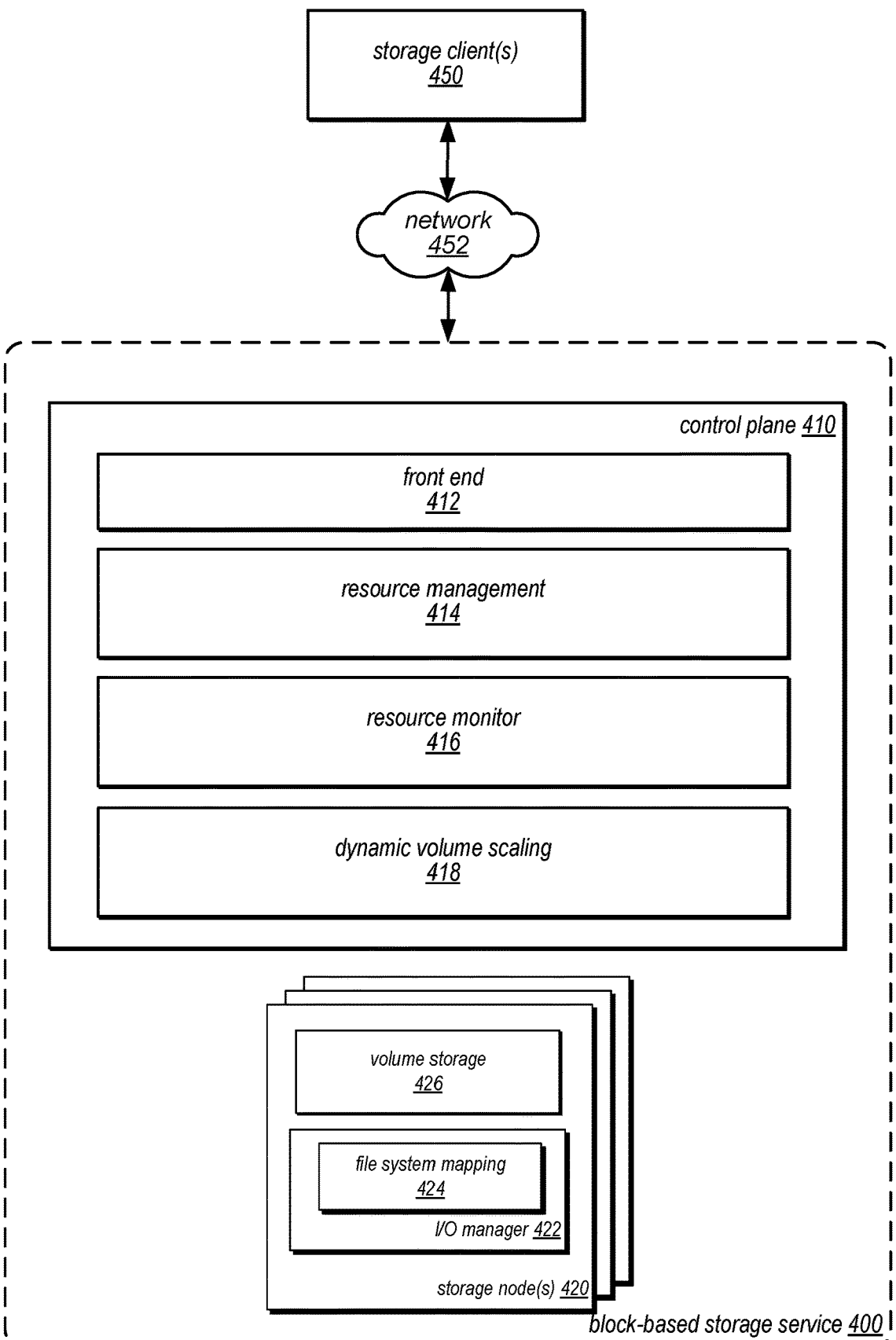
FIG. 4 is a block diagram illustrating various components of a block-based storage service, according to some embodiments.

FIG. 4 is a block diagram illustrating various components of a block-based storage service, according to some embodiments. One or more computing nodes or systems, such as computing system 1000 described below in FIG. 8 may implement the various components of block-based service 400. Storage client(s) 450 may access block-based storage service 400 via network 452 (similar to network 260 discussed above) or via internal network paths in a provider network (which may allow compute instances 232 to communicate with block-based storage service 400) discussed above.

In various embodiments, block-based storage service 400 may implement a front end module 412. Front end module 412 may be configured to receive service requests and forward the requests or initiate the appropriate response from resource management module 414, dynamic volume scaling module 418, or resource monitor 416. In various embodiments front end module 410 may be configured to translate requests for block-based storage service 400 according to a programmatic interface (API) for the service 400 and/or receive, process, indicate requests received via another interface, such as user interface implemented via a web site or command line interface at storage client(s) 450 that utilizes the programmatic interface.

In various embodiments, block-based storage service 400 may implement resource management module 414. Resource management module 414 may be configured to provision storage volumes for clients 450 and accept scaling policies for the storage volumes. For example, resource manager 414 may store information linking particular accounts (and associated storage volumes) at block-based storage service 400 to particular clients 450. For example, as a result of scaling events, different storage volume costs may be determined. The account information linked to storage volumes may allow for metering and billing for storage volumes to be added to the correct account. Resource management module 414 may, in some embodiments, store/manage access credentials or other information for clients 450 to access storage volumes. In some embodiments, resource management module 414 may implement various locking or synchronization schemes to allow multiple storage clients 450 to access the same storage volume. Resource management module 412 may be configured to provision storage resources, such as portions of volume storage 426 on storage nodes 420. Resource management module 414 may also provide access credentials and other identification information to clients 450 or instances in order to access the storage volume for a particular client 450.

In various embodiments, block-based storage service 400 may implement resource monitor 416. Resource monitor 416 may receive performance metrics, and/or perform health checks to storage node(s) 420. Resource monitor 416 may analyze, aggregate, and/or provide this data to resource manager 414 (to perform various resource management operations) and dynamic volume scaling module 418. For example, resource management module 414 may be configured to make placement decisions for provisioning or obtaining new storage/removing storage for scaling operations based on the performance metrics and other information collected by resource monitor 416. In at least some embodiments, resource monitor 416 may provide statistically-based predictions for which storage nodes can accept more data for storage volumes based on the scaling history for those volumes.

In various embodiments, block-based storage service may implement dynamic volume scaling module 418 to dynamically scale storage volumes. As discussed in more detail with regard to FIGS. 5 and 6 below, dynamic volume scaling module 418 may detect storage scaling events for particular storage volumes, modify the storage resources according to the scaling event and provide indications to storage clients of the scaling events. In at least some embodiments, dynamic volume scaling module may detect scaling events triggered for various block-based storage service performance criteria. For instance, certain storage node(s) 420 may be identified as "hotspots," receiving a larger proportion of network traffic than other storage nodes. Volume scaling events may be triggered to redistribute some volume storage to other storage nodes in order to reduce network traffic directed to the hotspot. Dynamic volume scaling module 418 may also direct the performance of various storage maintenance operations for storage volumes that are scaled. For example, defragmentation operations may be performed to reduce unutilized storage spaces in volume storage 426 at storage node(s) 420. Various other compaction, reclamation, and/or reorganization techniques may be direct from dynamic volume scaling module 418 (or other component of control plane 410 or I/O manager 422 at storage node(s) 422).

Block-based storage service 400 may implement multiple storage node(s) 420 to provide persistent storage for storage volumes maintained at the block-based storage service 400. A storage node 420 may be one or more computing systems or devices, such as a storage server or other computing system (e.g., computing system 1000 described below with regard to FIG. 8). Each storage node 420 may maintain respective replicas or portions of storage volumes in volume storage 426. Storage nodes 420 may also provide multi-tenant storage. For example, in some embodiments, a storage node may maintain storage volumes in volume storage 426 for multiple storage clients 450. Volume storage 426 may persist their respective data volumes in one or more block-based storage devices (e.g., hard disk drives, solid state drives, etc.) that may be directly attached to a computing system or device implementing the respective storage node 420. In various embodiments, storage nodes may have different types of configurations of storage devices, such that some storage volumes may be implemented on storage nodes with the corresponding storage device to provide a requested performance characteristic (e.g., highly-provisioned storage volumes on SSDs).

Block-based storage service 400 may manage and maintain storage volumes in a variety of different ways. Different durability schemes may be implemented for some storage volumes among two or more storage nodes maintaining a same replica of a data volume establishing a durability state for a storage volume. For example, different types of mirroring and/or replication techniques may be implemented (e.g., RAID 1) to increase the durability of a storage volume, such as by eliminating a single point of failure for a storage volume. In order to provide access to a data volume, storage nodes 420 may then coordinate I/O requests, such as write requests, among the two or more storage nodes maintaining a replica of a storage volume. For example, for a given storage volume one storage node may serve as a master storage node. A master storage node may, in various embodiments, receive and process requests (e.g., I/O requests) from clients of the storage volume. Thus, a master storage node may then coordinate replication of I/O requests, such as write requests, or any other changes or modifications to a storage volume to one or more other storage nodes serving as slave storage nodes. Thus, when a write request is received for a storage volume at a storage node, the storage node may forward the write request to another storage node and wait until storage node acknowledges the write request as complete before completing the write. Master storage nodes may direct other operations for storage volumes, like snapshot operations or other I/O operations (e.g., serving a read request). Please note, that in some embodiments, the role of master and slave storage nodes may be assigned per data volume.

Storage nodes 420 may implement respective I/O managers, such as I/O managers 422. I/O managers 422 may handle I/O request directed toward data volumes maintained at a particular storage node. Thus, I/O manager 422 may process and handle a write request to a storage volume at the storage node, for example. I/O manager 422 may be configured to process I/O requests according to block-based storage service application programming interface (API) and/or other communication protocols, such as such as internet small computer system interface (iSCSI). In some embodiments, I/O managers 340 may implement file system mapping information for storage volumes (or portions therefore maintained at the storage node 420). File system I/O may be serviced using the file system mapping information, in various embodiments.

Please note that the previous description of FIG. 4 is provided for illustrative purposes only and is not intended to be limiting as to the number, arrangement, or configuration of various components implementing the functionalities described.

Figure 5:
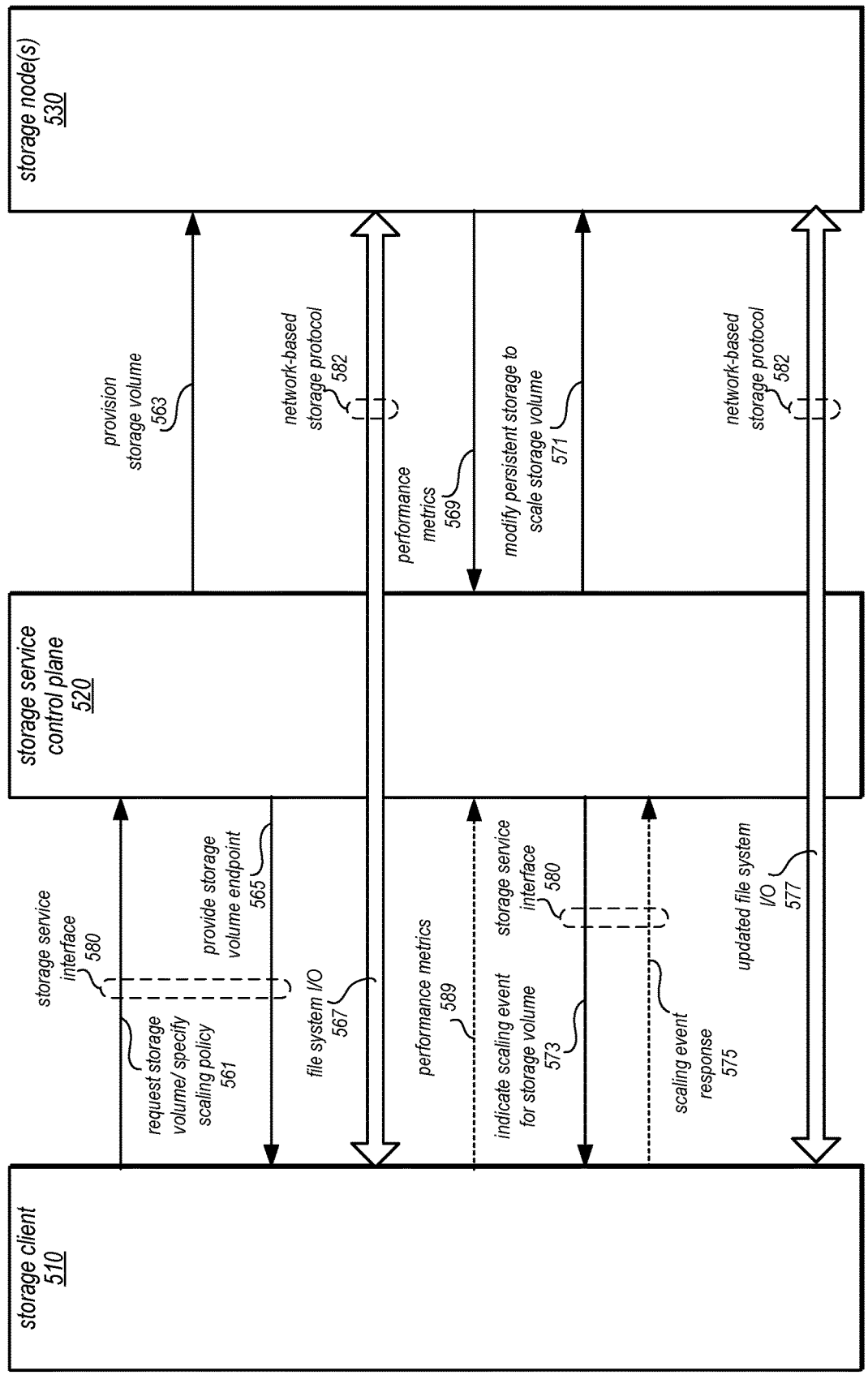
FIG. 5 is a block diagram illustrating interactions between a storage client and block-based storage service that implements dynamic storage volume scaling, according to some embodiments.

FIG. 5 is a block diagram illustrating interactions between a storage client and block-based storage service that implements dynamic storage volume scaling, according to some embodiments. Storage client 510 (or another client device acting on behalf of storage client 510) may send a request 561 for a storage volume to the storage service control plane 520 via storage service interface 580 (e.g., an API or GUI). The request may include various parameters including an initial size of the storage volume, as well as a file system configuration to format the storage volume upon creation. In various embodiments, the request 561 may specify a scaling policy for the storage volume via storage service interface 580. Please note that a separate request to specify the scaling policy may be made, as well as various requests to update, replace, and/or remove the scaling policy (not illustrated). Storage control plane 520 may provision the storage volume 563 across one or more storage resources, such as storage node(s) 530. Once provisioned, storage service control plane 520 may provide a storage volume endpoint 565 to storage client 510 via storage service interface 580. For example, an iSCSI target may be provided to storage client 510.

Storage client 510 may then initiate file system I/O to the storage volume maintained at storage node(s) 530, in some embodiments. File system I/O may be performed according to a network-based storage protocol 582, such as iSCSI. Performance metrics 569 as well as other information pertinent to monitoring the storage volume may be reported from the storage node(s) 530 to storage service control plane 520. In some embodiments, storage client 510 may send performance metrics 589 (some of which may not be collectible at the storage service) to storage service control plane 520 to be used in detecting scaling events. If a scaling event is detected for the storage volume, storage service control plane 520 may modify persistent storage to scale the storage volume 571. For example, various copy, move, allocate, delete, or defrag commands may be sent to storage node(s) 530. Storage service control plane 520 may also provide an indication of the scaling event for the storage volume 573 to storage client 510 via storage service interface 580. In at least some embodiments, storage client 510 may provide a scaling event response 575 via storage service interface 580, which may be used to coordinate and/or perform the modification of the persistent storage to scale the storage volume 571. Therefore, please note that the various messages illustrated in FIG. 5 may be sent and/or received at different times, and thus the previous description is not intended to be limiting. Once the file system is updated, storage client 510 may perform updated file system I/O 577 to the scaled storage volume. Note, that in at least some embodiments, the scaling of the storage volume is performed such that the storage volume is online and able to continue accept file system I/O.

Figure 6:
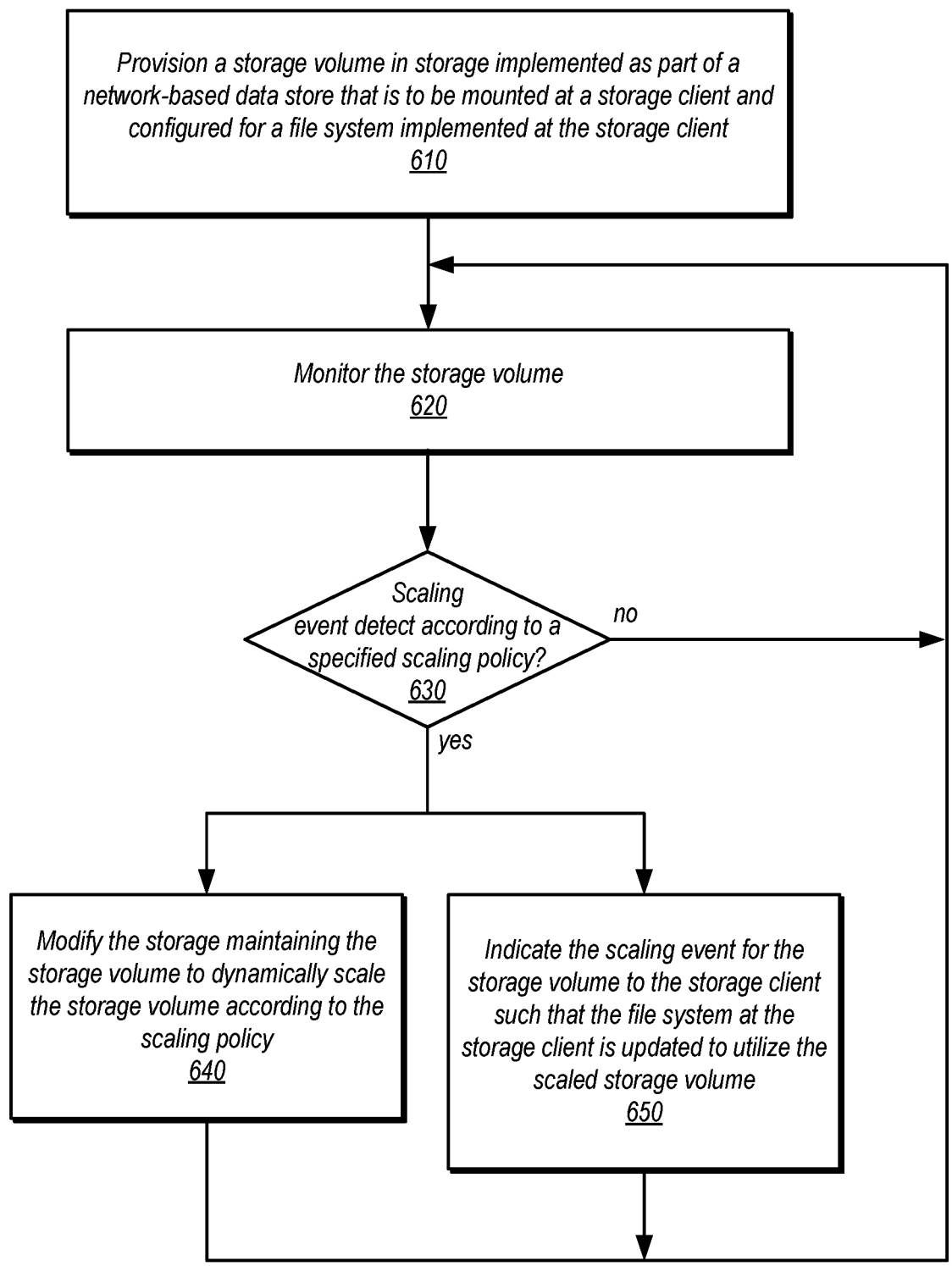
FIG. 6 is a high-level flowchart illustrating methods and techniques for implementing dynamic scaling of storage volumes for storage client file systems, according to some embodiments.
Figure 7:
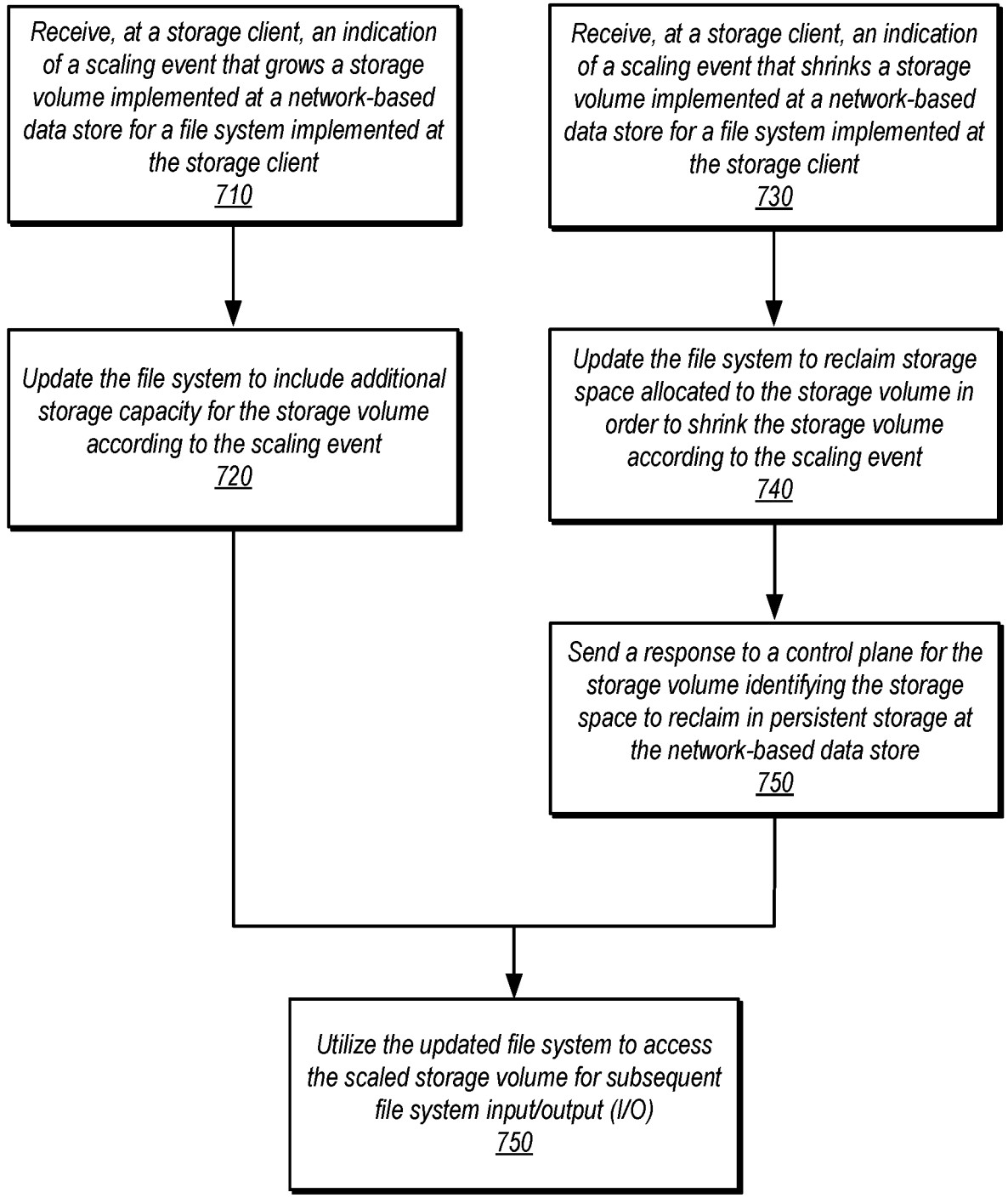
FIG. 7 is a high-level flowchart illustrating methods and techniques for updating a file system according to a scaling event for a storage volume for the file system, according to some embodiments.

Note that in various embodiments, the network-based or programmatic interfaces (such as an API) calls and responses described in FIGS. 1-5 above and FIGS. 6-7 below may be performed over a secure proxy connection (e.g., one managed by a gateway control plane into the service and/or provider network), or may be performed over the public network or, alternatively, over a private channel such as a virtual private network (VPN) connection. These and other APIs to and/or between components of the systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with a network-based data store, client device implementing remote durable logging, or other system, service, component, or device.

The various embodiments of dynamic scaling of storage volumes for storage client file systems, discussed above with regard to FIGS. 2-5 above, may perform dynamic scaling in different ways. Moreover, dynamic scaling of storage volumes for storage client file systems is not limited to such systems. Various other kinds of storage systems in addition to the example block-storage service may implement dynamic scaling. Additionally, file systems themselves may vary widely in type, scheme or implementation. Many different devices may also implement dynamic scaling of storage volumes for storage client file systems, including mobile computing devices, such as tablet computers, laptops, mobile phones, or personal digital assistants. FIG. 6 is a high-level flowchart illustrating methods and techniques for implementing dynamic scaling of storage volumes for storage client file systems, according to some embodiments. Different combinations of systems and/or devices may implement the various techniques discussed below.

As indicated at 610, a storage volume may be provisioned in storage implemented as part of a network-based data store, in various embodiments. A network-based data store may be a block-based data store, or other data store that a file system implemented at a storage client may utilize. A storage client may be any system, program, or device which may be configured to mount the storage volume in the network-based data store to service as storage for a file system implemented at the storage client. In at least some embodiments, a network-based storage protocol (e.g., internet small computer serial interface (iSCSI)) may be utilized to mount and communicate between the storage client and the storage volume in the network-based data store. Multiple storage clients may, in some embodiments, access the same storage volume and each may thus perform the techniques described below.

In at least some embodiments, a scaling policy may be included with a request to provision the storage volume. For example, a network-based interface, such as an API or GUI may be used to submit a provision request and define a scaling policy for the storage volume. A scaling policy may include one or more multiple conditions. For instance, the scaling policy may define different thresholds or alarms as well as the resulting scaling actions if met or triggered. For example, the amount of available storage capacity at the storage volume may have floor and/or ceiling thresholds which, if exceeded cause the amount of storage capacity in the storage volume to be increased or reduced accordingly. Similarly, in another example, the performance characteristics of the storage volume, such as the number of input/ output operations per second (IOPs) at one or more storage devices that store portions (or all) of the storage volume. The scaling policy may define the action taken in response to a triggered alarm. For instance, the scaling policy may define a rate or amount at which a storage volume can be increased or decreased. In some embodiments, the scaling policy may indicate a number of replicas or nodes maintaining a portion (or all of) the storage volume, to indicate whether the volume should be redistributed. In some embodiments, the scaling policy may be defined in terms of costs thresholds, if the network-based data store is a storage service. In some embodiments, the scaling policy may be described and provided to a network-based data store using an API, such as by entering various information into multiple different request fields and/or message flags. A scaling policy may be defined using various human-readable and/or scripting techniques (e.g., XML or JSON). In various embodiments, the scaling policy may be modified, replaced, and or deleted. Scaling policies may be modified or removed by clients and/or the network-based provider, in at least some embodiments.

In various embodiments, the storage volume (or storage volumes if monitoring across the network-based data store) may be monitored, as indicated at 620. Various performance metrics, traffic metrics, and/or any other information indicating whether a scaling event occurs may be collected and/or analyzed. A control plane, or other monitoring component may, in some embodiments, receive reports from various storage nodes or components maintaining the storage volume, or interact with a storage volume (e.g., a load balancer or other traffic controller). In some embodiments, storage clients may also provide various performance metrics. A scaling event may be detected according to the specified scaling policy for the storage volume, as indicated by the positive exit from 630, in various embodiments. A scaling event may be triggered by the failure/satisfaction of a condition of the scaling policy for the storage volume, which may be discerned based on an analysis of the performance metrics. The scaling event triggered may indicate the corresponding responsive action defined in the scaling policy, in various embodiments.

In some embodiments, network-based data store policies, placement schemes, or other service management operations or constraints may act as default scaling policies specified for storage volumes. For example, a scaling event may be detected if the available storage capacity on a particular storage node (which may be multi-tenant hosting portions of multiple different storage volumes). For one or more of the storage volumes on the particular storage node, the scaling event may trigger a redistribution of the storage volumes to one or more new storage locations (which may result in file system changes based on the modified storage locations for a storage volume). Similarly, heat management, traffic controls, and/or other storage system concerns may trigger scaling events to redistribute (or consolidate) the workload for handling file system I/O requests to the storage volumes.

If no scaling event is detected for a storage volume, then as indicated by the negative exit from 620, monitoring of the storage volume may continue. If a scaling event is detected for a storage volume, then as indicated by the positive exit from 630, the storage volume may be dynamically scaled. As indicated at 640, in various embodiments, the storage maintaining the storage volume may be modified to dynamically scale the storage volume according to the scaling policy. Thus, portions of current storage resources and devices, or new storage resources or devices (e.g., disk drives or storage nodes) may be added to or removed from maintaining the storage volume. In at least some embodiments, the modification of the persistent storage may be performed in response to information received from the storage client. For example, as discussed in more detail below with regard to FIG. 7, the file system may determine which storage locations to remove from a storage volume in order to scale the storage volume to a smaller size. As noted above, the modification of the persistent storage may be performed in accordance with the scaling policy which may, for example, limit the rate at which storage capacity and/or storage bandwidth (e.g., IOPs) may be increased or decreased for a storage volume.

As indicated at 650, the scaling event that is detected for the storage volume may be indicated to the storage client, in various embodiments. The indication may be provided so that the file system at the storage client is updated to utilize the scaled storage volume. For example, in some embodiments, the indication may provide information or parameters to perform resize operations at the storage client for the file system, such as by providing the amount of storage (e.g., number of data blocks/pages) that is increased or decreased at the storage volume. The indication may provide a script or executable that an operating system, or network-based data store agent operating at a storage client may perform to update the file system. In some embodiments, the indication of the scaling event may provide simple notification to the storage client of the change to the storage volume. The update to the file system may be to simply account for increased or decreased storage, as the network-based data store may maintain mapping information to link new/reconfigured storage locations as result of the scaling event for the storage volume with those storage locations presented to the storage client prior to the scaling event (shifting the burden for resize operations such as defragging files to the network-based data store instead of the file system at the storage client).

File systems implemented at storage clients may respond to scaled storage volumes in the network-based data store in different ways, as noted earlier. For example, some file systems may implement online resize functionality such that it may be sufficient to provide the storage client with an indication of the size of the scale storage node, allowing the file system to be updated according to the indicated size without further assistance or interaction with the network-based data store. However, some file systems may interact, cooperate, and/or coordinate with a control plane (or other network-based data store component that directs storage volume rescaling) to update the file system at the storage client and/or rescale the storage volume at the network-based data store. FIG. 7 is a high-level flowchart illustrating methods and techniques for updating a file system according to a scaling event for a storage volume for the file system, according to some embodiments.

Different types of scaling events, such as scaling events that grow or shrink a storage volume may be handled differently at a storage client, in various embodiments. As indicated at 710, in some embodiments, an indication may be received at a storage client of a scaling event that grows a storage volume implemented at a network-based data store for a file system implemented at the storage client. The indication may provide the increase amount, in various embodiments. For instance, the indication may provide the number of additional data blocks or pages of storage space allocated to the scaled storage volume. In some embodiments, mapping information, such as particular logical blocks assigned to the storage volume may be indicated, or such determinations may be left to/reserved for the file system at the storage client.

As indicated at 720, the file system may be updated to include additional storage capacity for the storage volume according to the indicated scaling event, in various embodiments. For instance, the file system may run one or more configuration operations to update file system metadata and/or other file system structures to make the additional storage capacity accessible to other programs, applications, components, or devices at the storage client which may make use of the additional storage space. Indexing structures, superblocks, and/or inodes are some of many different file system structures that may be modified when updating the file system to utilize the scaled storage volume. Once the file system is updated to include the additional storage capacity, then the updated file system may be utilized to access the scaled storage volume for subsequent file system input/output (I/O), as indicated at 730. For example, the programs, applications, components, or devices at the storage client which utilize the file system may now create utilize the additional storage capacity for storing additional files (or adding to existing files).

For some types of scaling events, the file system may play a greater role in scaling the storage volume at the network-based data. For example, as indicated at 730, an indication of a scaling event that shrinks a storage volume implemented at a network-based data store for a file system implemented at the storage client may be received at the storage client, in some embodiments. The indication may identify the reduction in storage capacity of the storage volume (e.g., a number of data blocks or pages).

The file system may be updated to reclaim storage space allocated to the storage volume in order to shrink the storage volume according to the scaling event, as indicated at 740, in various embodiments. For example, one or more resize operations may be performed to update file system metadata and/or other file system structures to reduce the storage capacity accessible to other programs, applications, components, or devices at the storage client which may make use of the storage space. Indexing structures, superblocks, and/or inodes are some of many different file system structures that may be modified when updating the file system to utilize the scaled storage volume. In a least some embodiments, as part of updating the file system, particular storage locations to reclaim may be identified, in various embodiments, in order to improve the performance of the file system for the shrunk storage volume. For example, certain storage locations may be selected for reclamation in order to tightly pack data in remaining storage locations. The file system at the storage client may understand which storage locations are more advantages to reclaim better than the network-based data store (which may be agnostic as to the implementation of the file system at the storage client). A response may be sent to the control plane for the storage volume that identifies the storage space to reclaim in persistent storage at the network-based data store, as indicated at 750, in various embodiments. In at least some embodiments, the persistent storage of the storage volume may not be modified until the response is received, identifying the particular storage space to reclaim (e.g., identifying the particular logical data blocks or pages).

Once the file system is updated to remove the reclaimed storage space in the storage volume, then the updated file system may be utilized to access the scaled storage volume for subsequent file system input/output (I/O), as indicated at 730. For example, the programs, applications, components, or devices at the storage client which utilize the file system may no longer utilize the reclaimed storage space, or consider the storage space when storing additional files (or adding to existing files).

Although the example described above for shrinking a storage volume with respect to elements 730 through 750 involves coordinating the reclamation of storage spaces between the file system at the storage client and the network-based data store, in at least some embodiments, the network-based data store may maintain mapping information for servicing file system I/O requests so that the network-based data store may select which storage spaces to reclaim (i.e. performing defragmentation) without performing the selection of storage spaces, or defragmentation at the storage client. For example, the logical block numbers presented to the file system at the storage client from the network-based data store may differ from the corresponding logical block numbers in the persistent storage for the storage volume. The mapping information may allow the control plane, or other component of the network-based data store to optimally select storage spaces to reclaim (i.e. defrag) without imposing that workload on the storage client. Instead, file system I/O requests from the storage client received at the network-based data store may be translated according to the mapping information maintained for the storage volume for servicing the request.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 8:
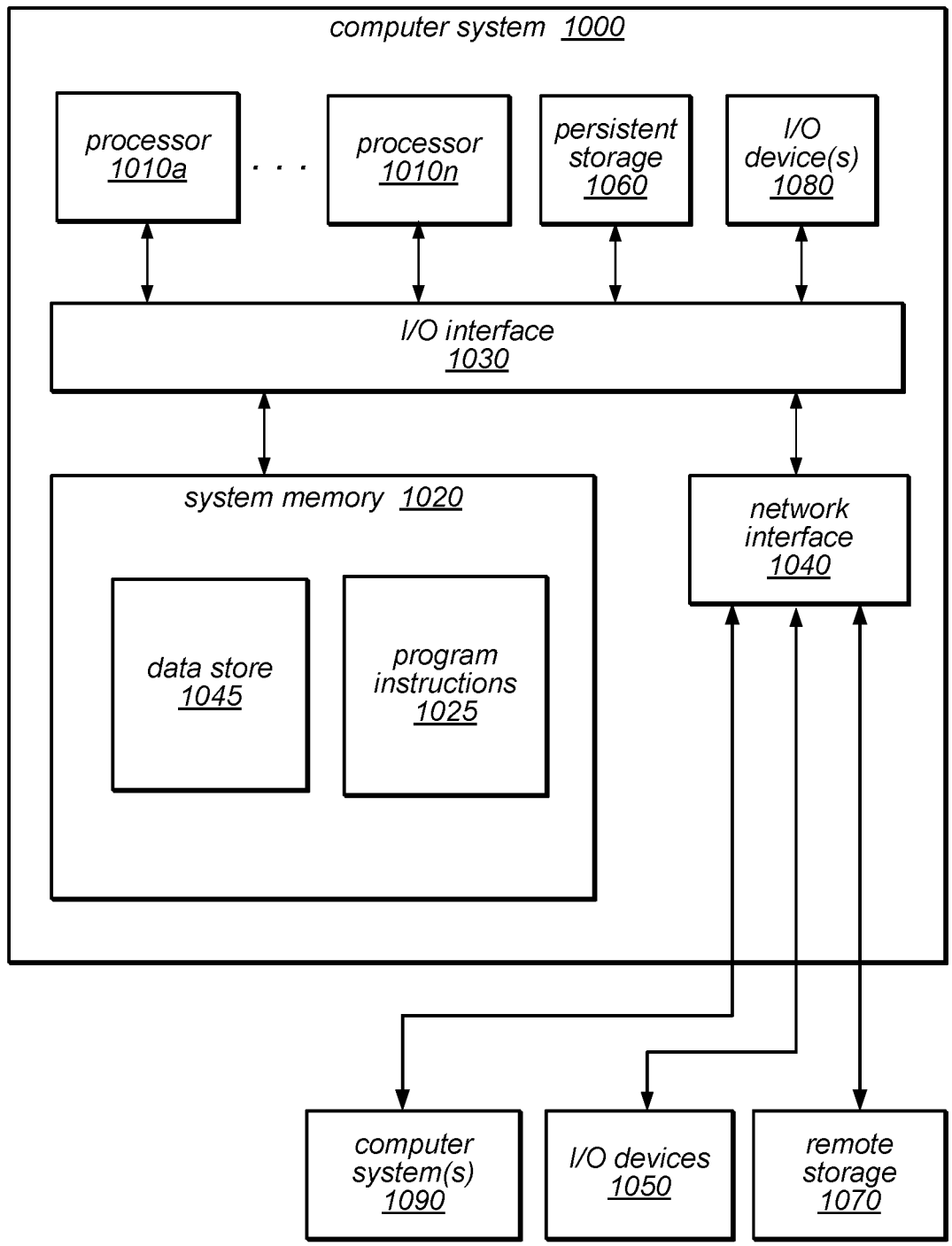
FIG. 8 is an example computer system, according to various embodiments.

FIG. 8 is a block diagram illustrating a computer system configured to implement dynamic scaling of storage volumes for storage client file systems, as described herein, according to various embodiments. For example, computer system 1000 may be configured to implement a client device, or one of a plurality of nodes or components of a network-based storage system or journaling file system service that are used to interact with remote versions of file system change logs, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the network-based services described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of journaling file system manager, or one of a plurality of nodes of a network-based service, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the network-based storage system may be stored in data store 1045 or in another portion of system memory 1020 on one or more nodes, in persistent storage 1060, and/or on one or more remote storage devices 1070, at different times and in various embodiments. Similarly, the information described herein as being stored may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more nodes implementing network-based services, and/or clients as described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a storage node within the storage service may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method, comprising:
receiving, at a storage service executing in a network-accessible provider network, a request to create a storage volume, wherein the request specifies an initial storage capacity of the storage volume;
creating the storage volume at the storage service according to the request;
hosting a virtual machine in the network-accessible provider network, wherein the virtual machine is configured to mount the storage volume and implement a file system on the storage volume;
causing the storage service to increase a storage capacity of the storage volume; and
causing the virtual machine to update the file system to use the increased storage capacity of the storage volume.

2. The method of claim 1, further comprising:
the increase in the storage capacity of the storage volume is caused by one or more service requests received via a user interface of the storage service.

3. The method of claim 1, further comprising:
the increase in the storage capacity of the storage volume is caused by one or more service requests received via a programmatic interface of the storage service.

4. The method of claim 1, wherein the virtual machine is hosted by a virtual compute service of the network-accessible provider network.

5. The method of claim 1, wherein the causing of the storage service to increase the storage capacity of the storage volume is performed while the storage volume is online.

6. The method of claim 1, wherein the causing of the storage service to increase the storage capacity of the storage volume is performed while the storage volume continues to accept file system requests to the file system.

7. The method of claim 1, further comprising:
in response to one or more service requests received at the storage service, creating a point-in-time snapshot of the storage volume.

8. The method of claim 1, further comprising:
in response to one or more service requests received at the storage service, creating and maintaining a replica of the storage volume.

9. The method of claim 1, further comprising:
in response to one or more service requests received at the storage service, deleting the storage volume at the storage service.

10. The method of claim 1, further comprising:
monitoring, by the storage service, one or more performance metrics of the storage volume.

11. The system of claim 1, wherein the storage service is configured to monitor one or more performance metrics of the storage volume.

12. A system, comprising:
a network-accessible provider network implemented by a plurality of computer systems and storage devices, configured to:
 receive, at a storage service executing in the network-accessible provider network, a request to create a storage volume, wherein the request specifies an initial storage capacity of the storage volume;
 create the storage volume at the storage service according to the request;
 host a virtual machine in the network-accessible provider network, wherein the virtual machine is configured to mount the storage volume and implement a file system on the storage volume;
 cause the storage service to increase a storage capacity of the storage volume; and
 cause the virtual machine to update the file system to use the increased storage capacity of the storage volume.

13. The system of claim 12, wherein:
the storage service implements a user interface; and
the increase in the storage capacity of the storage volume is caused by one or more service requests received via the user interface.

14. The system of claim 12, wherein:
the storage service implements a programmatic interface; and
the increase in the storage capacity of the storage volume is caused by one or more service requests received via the programmatic interface.

15. The system of claim 12, wherein:
the network-accessible provider network implements a virtual compute service; and
the virtual machine is hosted by the virtual compute service.

16. The system of claim 12, wherein the storage service increases the storage capacity of the storage volume while the storage volume is online.

17. The system of claim 12, wherein the storage service increases the storage capacity of the storage volume while the storage volume continues to accept file system requests to the file system.

18. One or more non-transitory computer-readable media having stored program instructions that when executed on or across one or more processors of a network-accessible provider network cause the network-accessible provider network to:
 receive, at a storage service executing in the network-accessible provider network, a request to create a storage volume, wherein the request specifies an initial storage capacity of the storage volume;
 create the storage volume at the storage service according to the request;
 host a virtual machine in the network-accessible provider network, wherein the virtual machine is configured to mount the storage volume and implement a file system on the storage volume;
 cause the storage service to increase a storage capacity of the storage volume; and
 cause the virtual machine to update the file system to use the increased storage capacity of the storage volume.

19. The one or more non-transitory computer-readable media of claim 18, wherein the program instructions when executed on or across the one or more processors cause the network-accessible provider network to increase the storage capacity of the storage volume while the storage volume is online.

20. The one or more non-transitory computer-readable media of claim 18, wherein the program instructions when executed on or across the one or more processors cause the network-accessible provider network to increase the storage capacity of the storage volume while the storage volume continues to accept file system requests to the file system.

* * * * *